Sept. 16, 1952           W. H. CUTTINO           2,611,009
CIRCUIT BREAKER CONTROL SYSTEM
Filed Nov. 29, 1947           2 SHEETS—SHEET 2
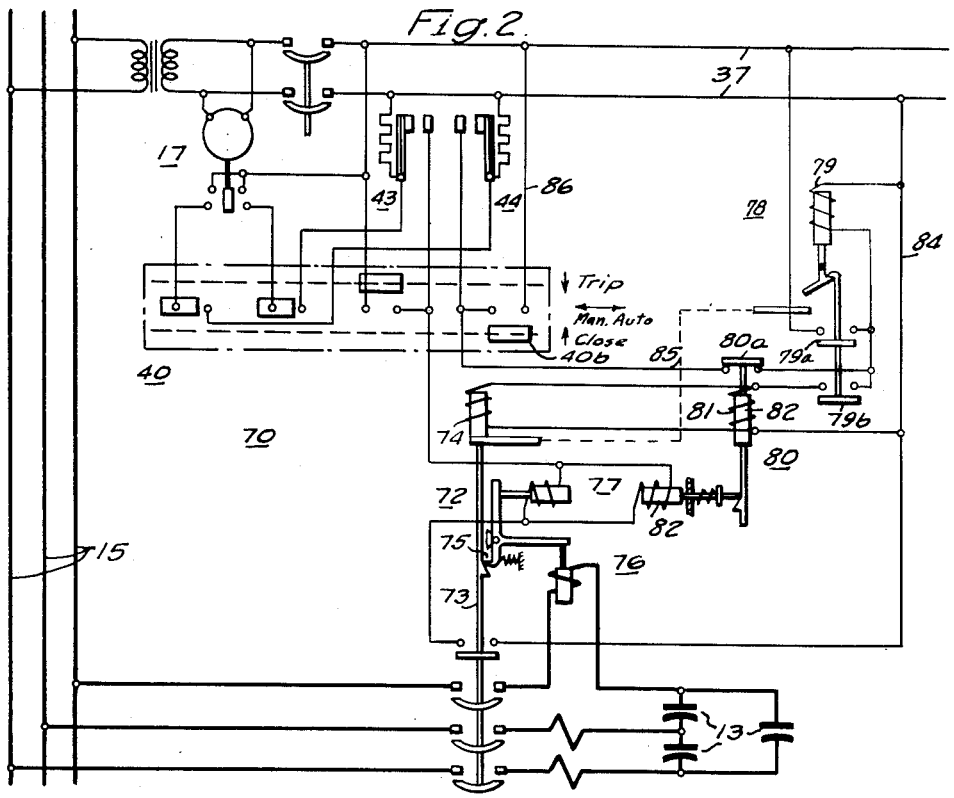
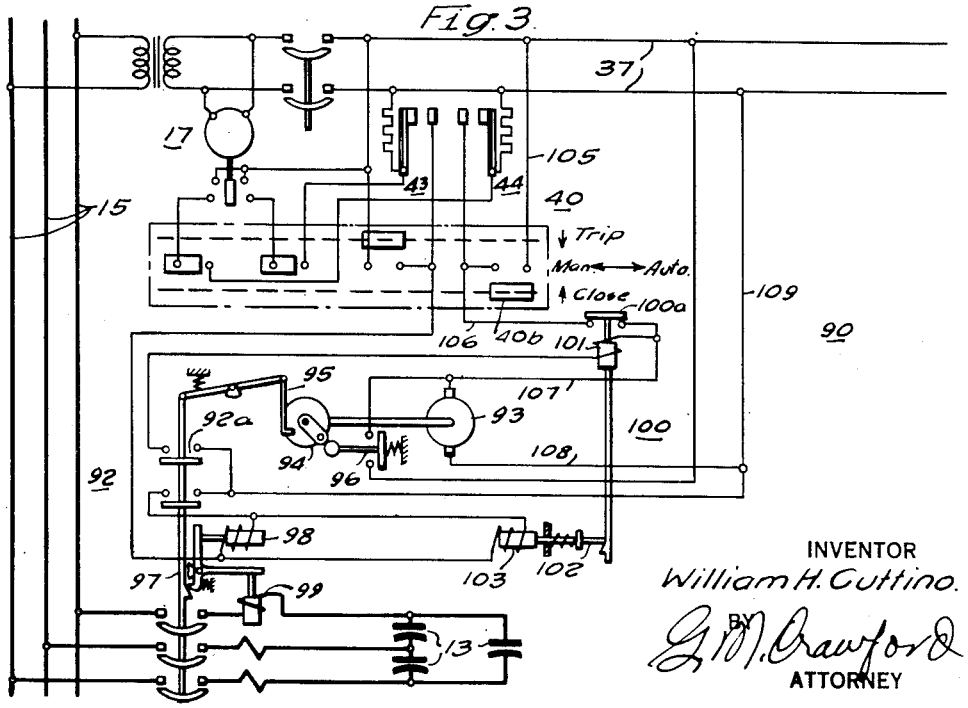
INVENTOR
William H. Cuttino.
BY
G. M. Crawford
ATTORNEY Patented Sept. 16, 1952

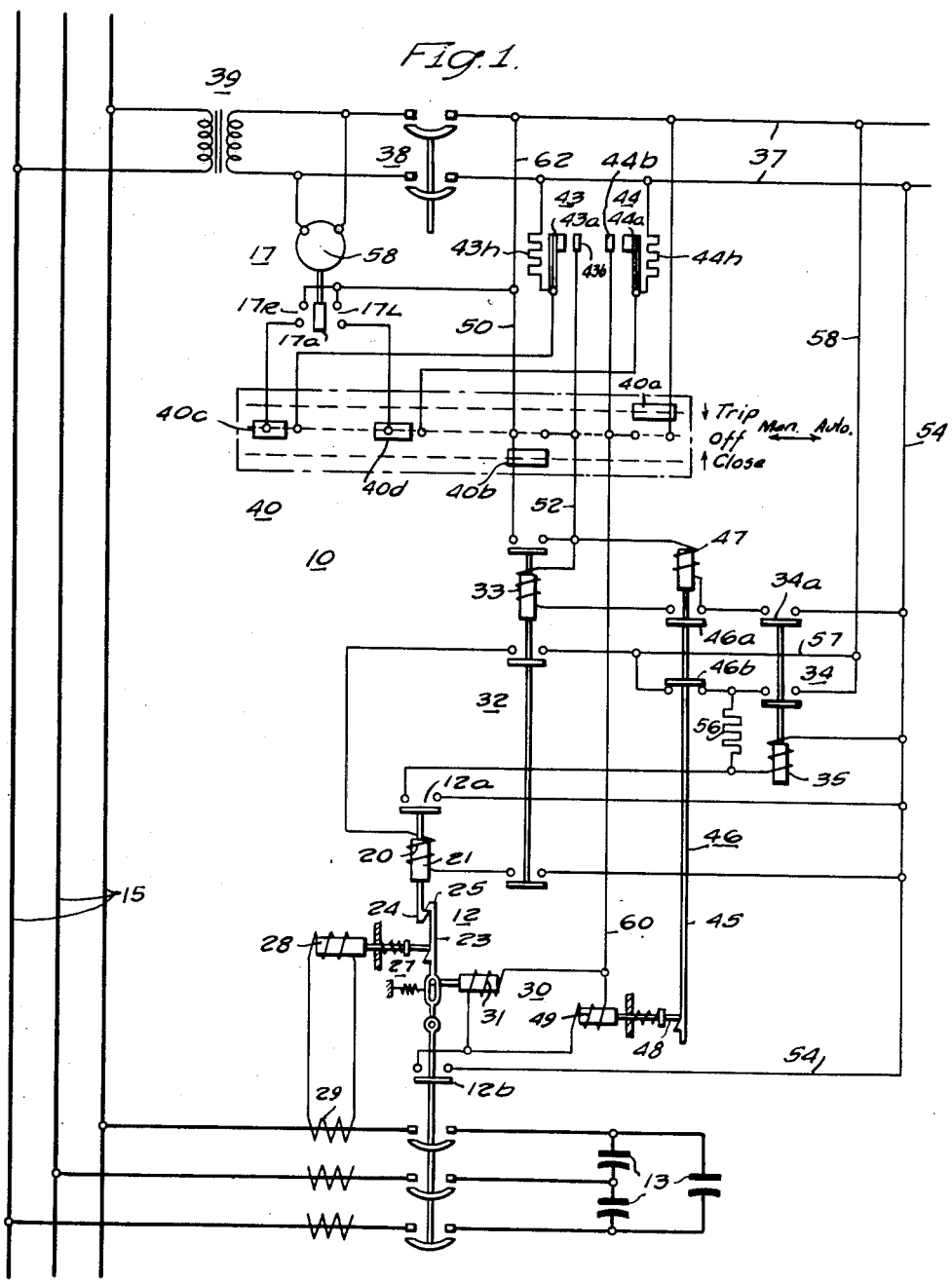

2,611,009

UNITED STATES PATENT OFFICE 2,611,009

CIRCUIT BREAKER CONTROL SYSTEM

William H. Cuttino, Wilkinsburg, Pa., assignor to Westinghouse Electric Corporation, East Pittsburgh, Pa., a corporation of Pennsylvania Application November 29, 1947, Serial No. 788,898

2 Claims. (Cl. 175—294)

My invention relates, generally, to control systems, and it has reference, in particular, to circuit breaker control systems suitable for controlling the connection of load devices, such as capacitor banks, to power circuits.

Generally stated, it is an object of my invention to provide an improved circuit breaker control system which is simple and inexpensive to manufacture and is reliable and effective in operation.

More specifically, it is an object of my invention to provide a circuit breaker control system for normally opening and closing the circuit breaker in response to predetermined variations in the voltage in a load circuit, and for preventing closing of the circuit breaker after it is opened in response to an overcurrent condition or other abnormal condition.

Another object of my invention is to provide, in an automatic switching system for capacitors, for preventing reconnection of the capacitors to the line after they have been disconnected therefrom due to a fault condition in the capacitors.

Yet another object of my invention is to provide, in automatic switching systems, for using a lockout relay of the mechanically-latched type for preventing the breaker from being reclosed after it is tripped in response to a fault current condition.

It is also an important object of my invention to provide, in an automatic switching system, for preventing reclosing of a circuit breaker regardless of whether the breaker is motor operated, controlled by a closing relay and a cut-off relay, or whether it is simply controlled by a single control relay.

Other objects will, in part, be obvious and will, in part, be explained hereinafter.

In practicing my invention in one of its forms a circuit breaker provided with both shunt and overcurrent trip means is controlled by a closing relay and a cut-off relay. The circuit breaker is operated normally under the control of a voltage relay, responsive to voltage conditions of a power circuit for connecting a bank of capacitors to the power circuit and disconnecting them therefrom. A lockout relay of a mechanically-latched type is used to set up an operating circuit for the closing relay, and to interrupt the operating circuit for the cut-off relay. The lockout relay is operated when the circuit breaker is closed, and is reset so as to permit reclosing the circuit breaker, only when the breaker is tripped by energizing the shunt trip means.

For a more complete understanding of the nature and scope of my invention, reference may be made to the following detailed description, which may be read in connection with the accompanying drawings in which:

Fig. 1 is a diagrammatic view of a capacitor switching system embodying the invention in one of its forms;

Fig. 2 is a diagrammatic view of a capacitor switching system embodying the invention in another form; and Fig. 3 is a diagrammatic view of a capacitor switching system embodying the invention in a still different form.

Referring to Fig. 1, the reference numeral 10 may denote, generally, a capacitor switching system wherein a circuit breaker 12 may be disposed to connect a bank of capacitors 13 to a power circuit comprising conductors 15, under the control of a voltage relay 17 responsive to the voltage of the power circuit.

The circuit breaker 12 may, for example, be of the trip-free type comprising, an operating winding 20 for actuating an armature 21 which may be connected to a breaker operating mechanism 23 by means of engaging latch members 24 and 25. The operating mechanism 23 may be latched in the closed position by means of overload trip means 27 having an operating winding 28. The operating winding 28 may be energized in accordance with the current drawn by the capacitors, being, for example, energized from a current transformer 29. Only one current transformer is shown connected for operating the overcurrent trip means in order to simplify the drawings.

The circuit breaker 12 may also be provided with shunt trip means 30 having an operating winding 31 which may be energized so as to actuate the operating mechanism 23 to disengage it from the armature 21 in order to open the circuit breaker.

The circuit breaker 12 also may be provided with suitable closing means comprising, for example, a closing relay 32 having an operating winding 33, and a cut-off relay 34 having an operating winding 35. The closing relay 32 may be disposed to connect the operating winding 20 of the circuit breaker to a suitable source of electrical energy which may be represented by the control bus conductors 37. These conductors 37 may be connected by means of a control circuit breaker 38 and a control transformer 39 to the power circuit conductors 15. The cut-off relay 34 may be connected for energization so as to be shunted through contact member 12a of the circuit breaker 12 and opened when the circuit breaker closes to thereby interrupt the energizing circuit for the closing relay 32.

Manual operation of the circuit breaker may be effected by means of a manual control switch 40, which may be operable to "trip" and "close" positions to energize the operating winding 31 of the shunt trip means, and the operating winding 33 of the closing relay, respectively.

Automatic operation of the circuit breaker 12 may be effected by connecting the closing relay 32 and the shunt trip means 30 for energization under the control of the voltage relay 17, which may be connected across the control transformer 39. Time delay relays 43 and 44 comprising stationary contact members 43b and 44b, and bimetallic contact members 43a and 44a provided with heaters 43h and 44h, may be connected in circuit relation with the closing relay and the shunt trip means by the voltage relay 17, so as to provide for delayed closing and opening of the circuit breaker as the voltage of the power circuit drops and rises, respectively.

The manual control switch 40 may be of the drum type, having contact members 40a and 40b actuable from the normal position of the switch to trip and close the circuit breaker, respectively. Contact members 40c and 40d may be so arranged that the operating handle of the switch must be moved axially from the normal position to connect the voltage relay 17 for effecting automatic operation of the circuit breaker.

In order to provide for normally reclosing the circuit breaker 12 when it is connected for automatic operation, and for preventing reclosure of the breaker when it is tripped by the overload trip means 27, a lockout relay 46 may be provided. The lockout relay may, for example, be of a type having an armature 45 provided with an operating winding 47 and a mechanical latch 48 for retaining the relay in the operated position. A reset winding 49 may be provided for releasing the latch 48 to return the relay to the non-operated position.

By connecting the normally open contact member 46a of the lockout relay in circuit relation with the operating winding 33 of the closing relay 32, and connecting normally closed contact member 46b of the lockout relay to provide a closing circuit for the cut-off relay 34, reclosing of the circuit breaker may be prevented. By connecting the reset winding 49 in shunt circuit relation with the operating winding 31 of the shunt trip means, the lockout relay may be reset each time the circuit breaker is stripped by the shunt trip means, so as to provide for reclosing the breaker. Since the lockout relay will remain in the operated position when the circuit breaker is tripped by means of the overload trip means 27, the circuit breaker cannot be automatically closed, since the lockout relay 46 must first be reset.

The circuit breaker 12 may be manually closed by operating the control switch 40 to the "close" position. An energizing circuit is thereby completed for the operating winding 47 of the lockout relay, extending from the upper conductor 37 through conductor 50, contact member 40b, conductor 52, operating winding 47, closed contact members 34a and conductor 54 to the lower of the conductors 37. Contact members 34a of the cut-off relay 34 are closed as soon as the control breaker 38 is closed as the cut-off relay is then energized from the control bus conductors 37 through an obvious energizing circuit including the conductor 54, operating winding 35, control resistor 56, contact members 46b and conductors 57 and 58.

When the lockout relay 46 operates, the operating winding 33 of the closing relay 32 will be energized through a circuit extending from the upper conductor 37 through conductor 50, contact members 40b, conductor 52, operating winding 33, contact members 46a and 34a, and conductor 54 back to the control bus. Accordingly, the closing relay 33 operates, and the operating winding 20 of the circuit breaker 12 will be energized, closing the circuit breaker and connecting the capacitors 13 to the conductors 15 of the power circuit. The cut-off relay 34 is shunted by contact members 12a, and interrupts the energizing circuit of the operating winding 33 at contact member 34a.

By moving the operating handle of the control switch 40 to the "off" position and then moving it axially to the right, to the "automatic" position, the voltage relay 17 may be connected for effecting automatic control of the circuit breaker 12. Should the moving contact member 17a of the voltage relay 17 engage stationary contact members 17R, the circuit breaker 12 will remain in a closed position; however, should the contact member 17a move to the right, so as to engage contact members 17L, the heater 44h will be connected across the control conductors 37. After a predetermined time delay, contact member 44a engages stationary contact member 44b, and an operating circuit is provided for the shunt trip winding 31, extending from the control bus through conductor 54, contact members 12b of the circuit breaker, shunt trip winding 31, conductor 60, contact members 44b, and 44a, contact member 40d, contact members 17L and 17a, and conductor 62 back to the control bus. The shunt trip means actuates the operating mechanism 23 of the circuit breaker, so as to disengage the latch members 24 and 25 and trip the circuit breaker.

Since the reset winding 49 of the lockout relay 46 is connected in shunt circuit relation with the operating winding 31 of the shunt trip means, the lockout relay will be reset. Accordingly, the cut-off relay 34 will return to the operated position as soon as contact member 46b closes. Thus when the voltage relay 17 subsequently operates to complete an energizing circuit for the closing relay 32, this circuit is already set up through contact members 34a of the cut-off relay 34. When the lockout relay 46 operates, it completes the energizing circuit for the operating winding 33 of the closing relay 32 and the circuit breaker 12 will then reclose.

Should an internal fault occur in one of the capacitors 13, the operating winding 28 of the overcurrent trip means 27 will be energized sufficiently to release the operating mechanism 23 and open the circuit breaker. Since the lockout relay 46 now remains in the energized position, the operating circuit for the cut-off relay 34 is interrupted at contact member 46b. Accordingly, the cut-off relay 34 remains in the de-energized position, and the energizing circuit for the closing relay 32 will be interrupted at contact members 34a, so that the breaker may not be reclosed automatically after it opens in response to an overcurrent condition.

Referring to Fig. 2 the reference numeral 70 may denote, generally, a capacitor control system wherein a bank of capacitors 13 may be connected by means of a circuit breaker 72 to the conductors 15 of a power circuit in response to operation of a voltage relay 17 energized from the conductors 15. In this instance, the circuit breaker 72 is of the non-trip free type, and may comprise an armature 73 having an operating winding 74 and provided with latch means 75 for retaining it in the closed position. Overcurrent trip means 76 and shunt trip means 77 may be provided for actuating the latch means 75 to open the circuit breaker.

Operation of the circuit breaker 72 may be provided for by means of a closing relay 78 having an armature disposed to be mechanically latched to operate contact members thereof and unlatched therefrom by the breaker when it closes, and having operating winding 79 which may be energized from the control bus conductors 37, either manually through the operation of a control switch 40, or automatically under the control of the voltage relay 17. Time delay relays 43 and 44, which may be similar to those described in connection with the system shown in Fig. 1, may be provided for effecting delayed operation of the circuit breaker in response to operation of the voltage relay 17.

In order to provide for effecting automatic reclosing of the circuit breaker 72 when it opens under the control of the shunt trip means 77, and preventing reclosing of the circuit breaker when it is tripped by the overcurrent trip means 76, a lockout relay 80 may be utilized similar to that described in connection with the control system shown in Fig. 1, having an operating winding 81 and a reset winding 82. The lockout relay may be connected so as to provide, in its deenergized position, an energizing circuit for the operating winding 79 of the closing relay 78 through contact member 80a. The reset winding 82 of the lockout relay may be connected in shunt circuit relation with the shunt trip means 77, so as to insure an operating circuit for the closing relay 78 whenever the circuit breaker 72 is tripped by the shunt trip means 77. The operating winding 81 of the lockout relay may be connected in shunt circuit relation with the operating winding 74 of the breaker.

In operation, the control system 70 functions in substantially the same manner as the control system 10 of Fig. 1. When the control switch 40 is operated to the "close" position, an energizing circuit is provided for the closing relay 78, extending from one bus conductor 37, through conductor 84, operating winding 79, contact members 80a, conductor 85, contact member 40b and conductor 86 back to the other bus conductor. The closing relay operates, and provides an obvious energizing circuit for the operating winding 74 of the circuit breaker through contact members 78a and 78b. At the same time the operating winding 81 of the lockout relay 80 is energized and the relay operates and is latched in its operated position.

Should an overcurrent condition of the capacitors 13 result, the latch means 75 will be actuated by the overcurrent trip means 76 to open the circuit breaker. Since the lockout relay 80 remains in the operated position the energizing circuit for the closing relay 78 will be interrupted at contact members 80a, and the circuit breaker can not be reclosed without resetting the lockout relay.

Should the circuit breaker be tripped through operation of the voltage relay 17, or operation of the control switch 40 to the "trip" position, the reset winding 82 of the lockout relay will be energized along with the shunt trip means 77. Accordingly, the lockout relay 80 will be restored to the deenergized position, so as to set up an operating circuit for the closing relay 78 through contact members 80a. The breaker may, therefore, be reclosed by the relay 17 or the control switch 40.

Referring to Fig. 3, the reference numeral 90 may denote, generally, a capacitor switching system wherein a bank of capacitors 13 may be connected by means of a circuit breaker 92 to a power circuit comprising conductors 15, under the control of a voltage relay 17 responsive to the voltage of the power circuit, or in response to operation of a manual control switch 40.

In this embodiment of the invention, the circuit breaker 92 is of the motor-operated type, having an operating motor 93 connected in driving relation with a closing cam 94, which may be disposed to actuate a closing lever 95 to close the circuit breaker. A limit switch 96 may be utilized to provide an operating circuit for the motor 93 over a predetermined operating range, and latch means 97 may be provided for retaining the breaker in the closed position. Shunt trip means 98 and overcurrent trip means 99 may be provided for actuating the latch means 97 to trip the circuit breaker.

In order to provide for reclosing the circuit breaker 92 whenever it is tripped under the control of the voltage relay 17, or through operation of the manual control switch 40, a lockout relay 100 may be utilized, having an operating winding 101 and latch means 102 for retaining the relay in the operated position. A reset winding 103 may be provided for actuating the latch means 102 to restore the relay to the deenergized position.

The circuit breaker 92 may be closed through operation of the manual control switch 40, whenever the control circuit breaker 38 is closed to energize the bus conductors 37. An obvious energizing circuit from the control bus is thereby provided for the operating of the motor 93, extending through conductor 105, contact member 40b, conductor 106, contact members 100a, conductor 107, motor 93, and conductors 108 and 109 back to the control bus. As soon as the motor 93 commences to operate the limit switch 96 closes and maintains an energizing circuit for the motor until it reaches the closed position. As the breaker closes, contact members 92a close and the operating winding 101 of the lockout relay 100 is energized in parallel circuit relation with the motor 93, through contact member 92a of the circuit breaker. The relay 100 operates to interrupt the starting circuit for the motor at contact members 100a. The limit switch 96 subsequently interrupts the running circuit of the motor.

Should the circuit breaker 92 be tripped by the overcurrent trip means 99, the circuit breaker remains open, since the operating circuit for the motor is interrupted by the lockout relay 100, which is latched in its energized position. Should the circuit breaker be opened by operation of the shunt trip means 98, the reset winding 103, which is connected in parallel circuit relation therewith, will also be energized. Accordingly, the lockout relay 100 returns to the deenergized position. The starting circuit for the motor 93 is thereupon set up, since contact members 100a are now closed. Accordingly, the circuit breaker may be reclosed under the control of the voltage relay 17, or of the control switch 40.

From the above description and the accompanying drawings it will be apparent that I have provided in a simple and effective manner for selectively controlling the operation of a circuit breaker in an automatic switching system. The circuit breaker may be readily reclosed when it is opened in response to operation of the shunt trip means, while reclosing is prevented when the breaker opens in response to an overcurrent or other fault condition. These characteristics are particularly suitable for the automatic switching of capacitors, wherein it is desired to normally open and close the circuit breaker in response to variations in the voltage of the power circuit to which the capacitors are to be connected. In the event of a fault condition occurring in one of the capacitors, which would result in an overcurrent condition at the circuit breaker controlling the connection of the capacitors and yet not necessarily resulting in an overcurrent condition of the power circuit itself, it is desirable to disconnect the capacitors and prevent their reconnection to the power circuit. This prevents undue damage to the capacitors. A capacitor switching system embodying the features of my invention as hereinbefore described is simple and inexpensive to manufacture, and is reliable and effective in operation.

Since certain changes may be made in the above described construction, and different embodiments of the invention may be made without departing from the spirit and scope thereof, it is intended that all the matter contained in the above description and shown in the accompanying drawings shall be considered as illustrative, and not in a limiting sense.

I claim as my invention:

1. In a control circuit for a circuit breaker operable to connect a load to a power circuit and having one trip device with a shunt winding and another with a series overcurrent winding operable to trip the breaker, a closing relay having an operating winding, a cutoff relay having contacts connected in series circuit with the operating winding of the closing relay, means including a voltage relay operable to selectively provide operating circuits for the closing relay and shunt trip device, a lockout relay of the latched-in-position type having an operating winding and a reset winding, a circuit connecting the operating winding of the lockout relay to the power circuit to operate the lockout relay and connect the operating winding of the closing relay in shunt circuit therewith, and an additional circuit connecting the reset winding in shunt relation with the shunt winding of the trip device for resetting the lockout relay to provide an operating circuit for the cutoff relay.

2. An automatic switching system for a power circuit comprising, a circuit breaker having a shunt trip device and a series overcurrent trip device, means including a closing relay operable to close the breaker, a cutoff relay having contacts connected in series circuit with the closing relay to deenergize it when the breaker closes, said cut-off relay having an operating winding which is normally energized and is shunted by the breaker when it closes, a lockout relay of the latched-in-operated-position type having an operating winding and a reset winding, a circuit connecting the closing relay to the power circuit including contacts of the lockout relay closed when the lockout relay is operated, means including voltage and time delay relays operable to selectively connect the operating winding of the lockout relay and the shunt trip device to the power circuit, another circuit connecting the reset winding in shunt circuit with the shunt trip device, and a circuit connecting the cut-off relay to the power circuit including contacts of the lockout relay closed when the lockout relay is reset.

WILLIAM H. CUTTINO.

REFERENCES CITED

The following references are of record in the file of this patent:

UNITED STATES PATENTS

| Number | Name | Date |
|---|---|---|
| 1,718,448 | Yamazaki | June 25, 1929 |
| 1,718,516 | Anderson | June 25, 1929 |
| 1,756,844 | Anderson | Apr. 29, 1930 |
| 1,756,903 | Fuller | Apr. 29, 1930 |
| 1,780,664 | Anderson | Nov. 4, 1930 |
| 1,780,676 | Hough | Nov. 4, 1930 |
| 2,196,418 | Kintzing | Apr. 9, 1940 |